United States Patent
Keohane et al.

(10) Patent No.: US 10,747,581 B2
(45) Date of Patent: Aug. 18, 2020

(54) VIRTUAL MACHINE MIGRATION BETWEEN SOFTWARE DEFINED STORAGE SYSTEMS

(71) Applicant: International Business Machines Corporation, Armonk, NY (US)

(72) Inventors: Susann M. Keohane, Austin, TX (US); Gerald F. McBrearty, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 15/433,631

(22) Filed: Feb. 15, 2017

(65) Prior Publication Data

US 2018/0232249 A1    Aug. 16, 2018

(51) Int. Cl.
  *G06F 9/455*    (2018.01)
  *G06F 9/50*    (2006.01)

(52) U.S. Cl.
  CPC .................. *G06F 9/5077* (2013.01)

(58) Field of Classification Search
  CPC .................................................... G06F 9/5077
  See application file for complete search history.

(56) References Cited

U.S. PATENT DOCUMENTS

| | | | |
|---|---|---|---|
| 7,149,859 B2* | 12/2006 | Fujibayashi | G06F 3/0607 711/162 |
| 8,219,653 B1 | 7/2012 | Keagy et al. | |
| 8,555,278 B2* | 10/2013 | Janakiraman | G06F 3/0607 718/1 |
| 8,954,962 B2 | 2/2015 | Malik et al. | |
| 9,110,727 B2 | 8/2015 | Brock et al. | |
| 9,197,489 B1* | 11/2015 | Vincent | H04L 67/148 |
| 9,229,850 B1* | 1/2016 | Wang | G06F 9/5016 |
| 9,379,994 B2* | 6/2016 | Wray | H04L 47/70 |
| 9,940,019 B2* | 4/2018 | Li-On | G06F 3/0604 |
| 2012/0054367 A1* | 3/2012 | Ramakrishnan | G06F 9/4856 709/242 |
| 2012/0221790 A1* | 8/2012 | Nunez | G06F 3/0617 711/114 |

(Continued)

*Primary Examiner* — Wissam Rashid
(74) *Attorney, Agent, or Firm* — Scott A. Stinebruner; Jordan A. Lewis (57) ABSTRACT

Virtual machine volumes may be migrated between software defined storage (SDS) systems by an orchestration engine configured to manage one or more virtual machines. The orchestration engine may identify one or more volumes associated with the one or more virtual machines and resident in a first SDS system to migrate to a second SDS system, and for each identified volume among the one or more identified volumes, the orchestration engine may create a replacement volume for the identified volume on the second SDS system, map the replacement volume to the associated virtual machine for the identified volume, cause the associated virtual machine to discover the replacement volume, mirror data from the identified volume to the replacement volume, unmap the identified volume from the associated virtual machine, and delete the identified volume from the first SDS system.

19 Claims, 7 Drawing Sheets

(56) References Cited

U.S. PATENT DOCUMENTS

| | | | |
|---|---|---|---|
| 2014/0033201 A1* | 1/2014 | Dawkins | G06F 11/1484 718/1 |
| 2014/0095826 A1* | 4/2014 | Rajagopal | G06F 3/0605 711/170 |
| 2014/0101302 A1 | 4/2014 | Yang et al. | |
| 2016/0048408 A1 | 2/2016 | Madhu et al. | |

* cited by examiner

VIRTUAL MACHINE MIGRATION BETWEEN SOFTWARE DEFINED STORAGE SYSTEMS

BACKGROUND

The invention is generally related to computers and computer software, and in particular, to logically-partitioned and virtualized computing environments.

Computing technology has advanced at a remarkable pace, with each subsequent generation of computing system increasing in performance, functionality, and storage capacity, often at reduced cost. In addition, workload allocation of computing and other hardware resources is often employed to maximize the utilization of hardware resources such as processors, memories, networks, storage devices, etc., and thereby reduce the overall costs necessary for supporting a desired workload capacity. Optimizing workload allocation can also have a positive impact on power costs and environmental concerns due to a reduction in the amount of hardware resources required to support a given workload.

Many computer or data processing systems employ virtualization, also referred to as logical partitioning, which enables one or more individual physical computers to each run several operating environments, or operating systems, at once in a virtualized computing environment. In some instances, for example, a single physical computer, which may also be referred to as a host, can run a plurality of operating systems in a corresponding plurality of virtual machines (VMs), also referred to as logical partitions (LPARs). Each operating system resides in its own virtual machine, with each virtual machine allocated a part of a physical processor, an entire physical processor, or multiple physical processors from the computer. Additionally, a portion of the computer's memory may be allocated to each virtual machine. An underlying partition manager, often referred to as a hypervisor or virtual machine monitor (VMM), manages and controls the virtual machines. The hypervisor is typically a part of the system firmware and manages the allocation of resources to the operating systems and virtual machines. As such, one physical computer may run one or more virtual machines and thus virtualize the underlying hardware resources used by the applications, operating systems, and other program code configured to operate in those virtual machines.

Virtualization is increasingly used in data centers and cloud computing applications, which may provide for cost efficiencies through elastic computing, whereby hardware resources from multiple hosts are provisioned and de-provisioned based on workload changes. In such applications, individual workloads may change over time, and as such virtualization may be employed to effectively multiplex hardware resources over multiple workloads to provide an overall greater resource utilization. Some data centers and cloud computing applications may also support the virtualization of other types of hardware resources, such as storage devices and networks, which may enable virtual machines to access virtual networks and/or storage devices, and with the particulars of the underlying hardware supporting such virtual entities managed in a manner that is effectively hidden from the virtual machines. The allocation of such hardware resources to virtual machines may also impact performance and efficiency, as overloading networks and/or storage devices can lead to slow response times, and in some instances, to an inability of a virtual machine to connect to an underlying hardware resource.

Some storage systems, for example, utilize software defined storage (SDS), where a storage controller such as a storage area network (SAN) controller manages logical storage volumes, or simply volumes, utilized by virtual machines, e.g., to store virtual disk images used by the virtual machines. SDS systems may be implemented principally in software running on a storage controller to manage access to arrays of commodity storage devices in some applications, while in other applications SDS systems may employ storage devices with additional virtualization functionality. Some virtualized environments may even employ multiple SDS systems, however, these SDS systems are generally not integrated with one another so volumes placed in one SDS system generally remain in that SDS system over the course of their lifetimes.

Optimizing the placement of virtual machines and the allocation of hardware resources to virtual machines can improve the performance and responsiveness of virtual machines while also utilizing the resources of a virtual computing environment in an efficient and cost effective manner. Accordingly, a continuing need exists in the art for optimizing the placement of virtual machines and the allocation of hardware resources in a virtual computing environment.

SUMMARY

According to an embodiment of the present invention, virtual machine volumes may be migrated between software defined storage (SDS) systems by an orchestration engine configured to manage one or more virtual machines. The orchestration engine may identify one or more volumes associated with the one or more virtual machines and resident in a first SDS system to migrate to a second SDS system, and for each identified volume among the one or more identified volumes, the orchestration engine may create a replacement volume for the identified volume on the second SDS system, map the replacement volume to the associated virtual machine for the identified volume, cause the associated virtual machine to discover the replacement volume, mirror data from the identified volume to the replacement volume, unmap the identified volume from the associated virtual machine, and delete the identified volume from the first SDS system.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

It is understood in advance that although this disclosure includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
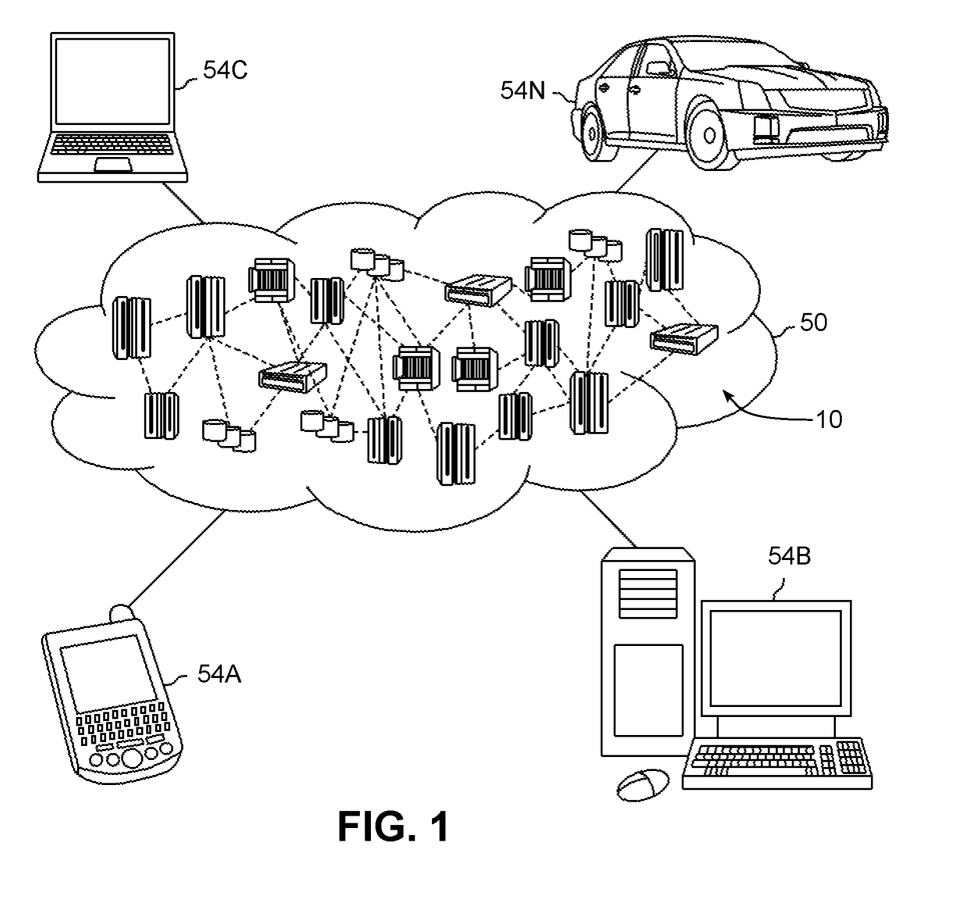
FIG. 1 depicts an example cloud computing environment consistent with the invention.

Referring now to the Drawings, wherein like numbers denote like parts throughout the several views, FIG. 1 depicts an illustrative cloud computing environment 50 suitable for use in embodiments consistent with the invention. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
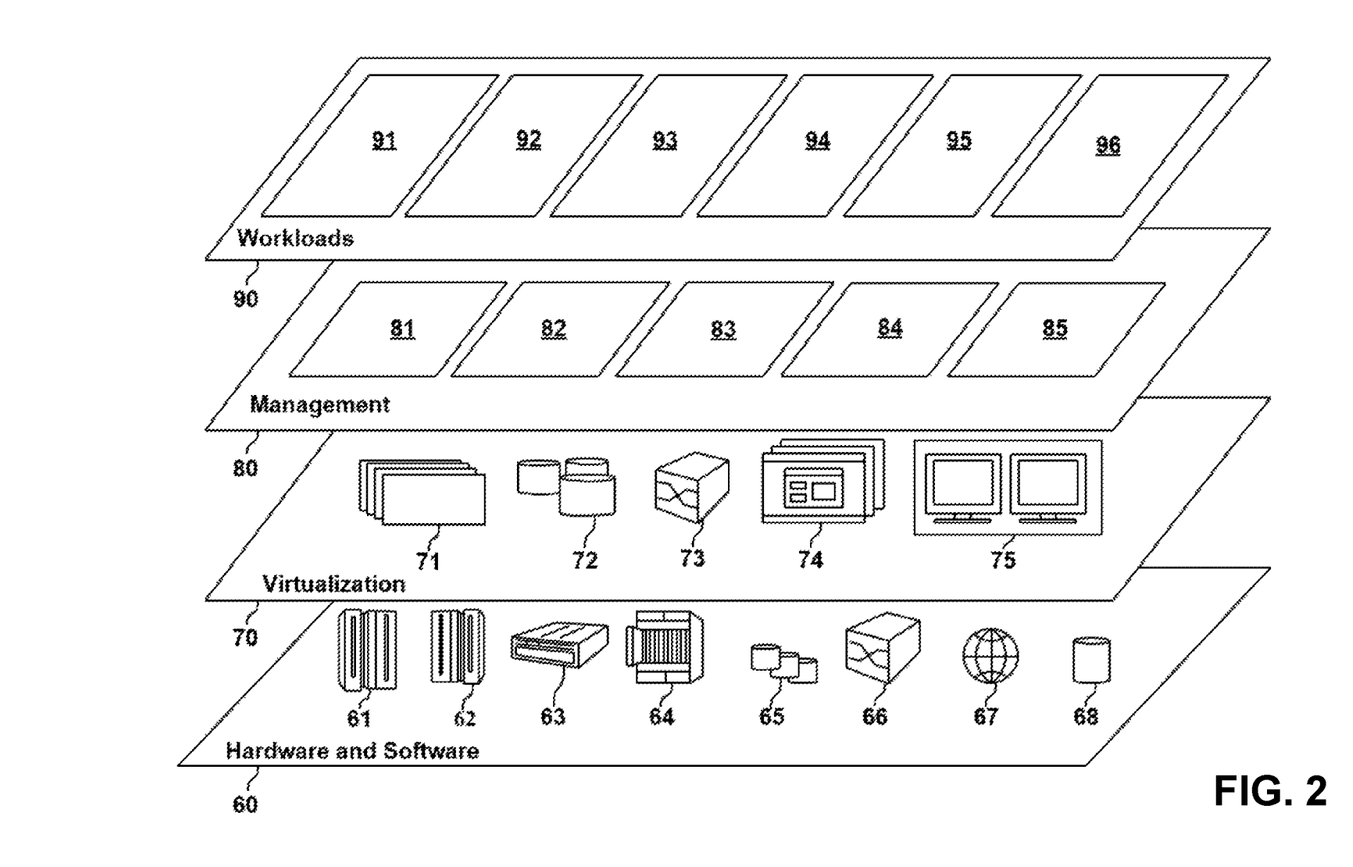
FIG. 2 depicts abstraction model layers according to an example embodiment consistent with the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3A:
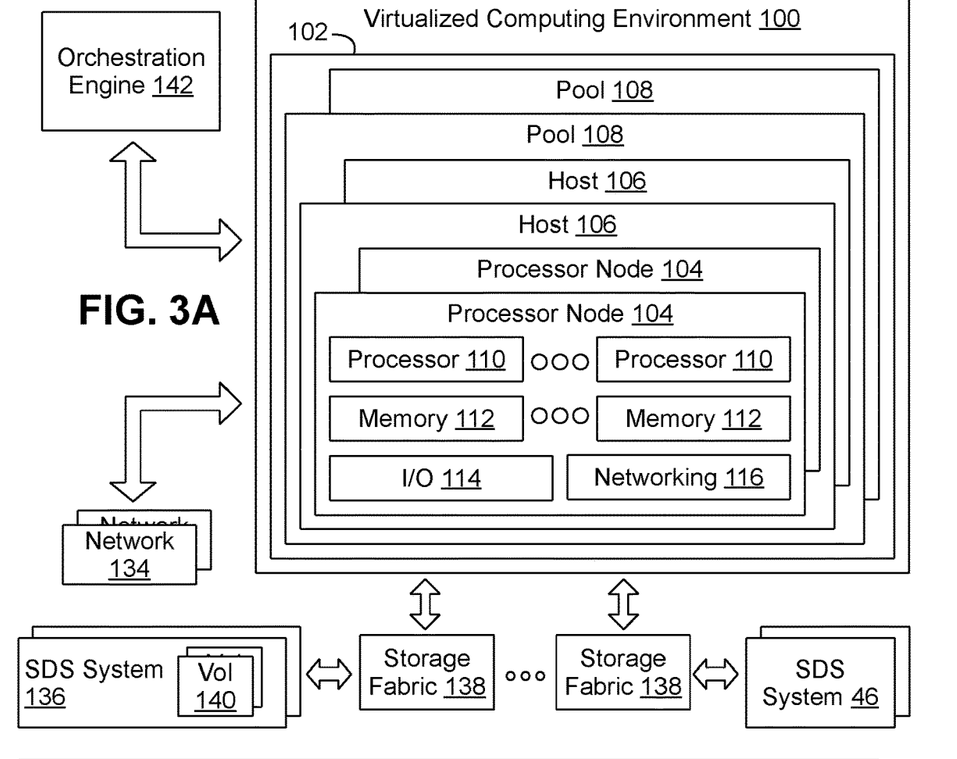
FIGS. 3A and 3B are block diagrams of an example hardware (FIG. 3A) and software (FIG. 3B) environment suitable for implementing a virtualized computing environment consistent with the invention.
Figure 3B:
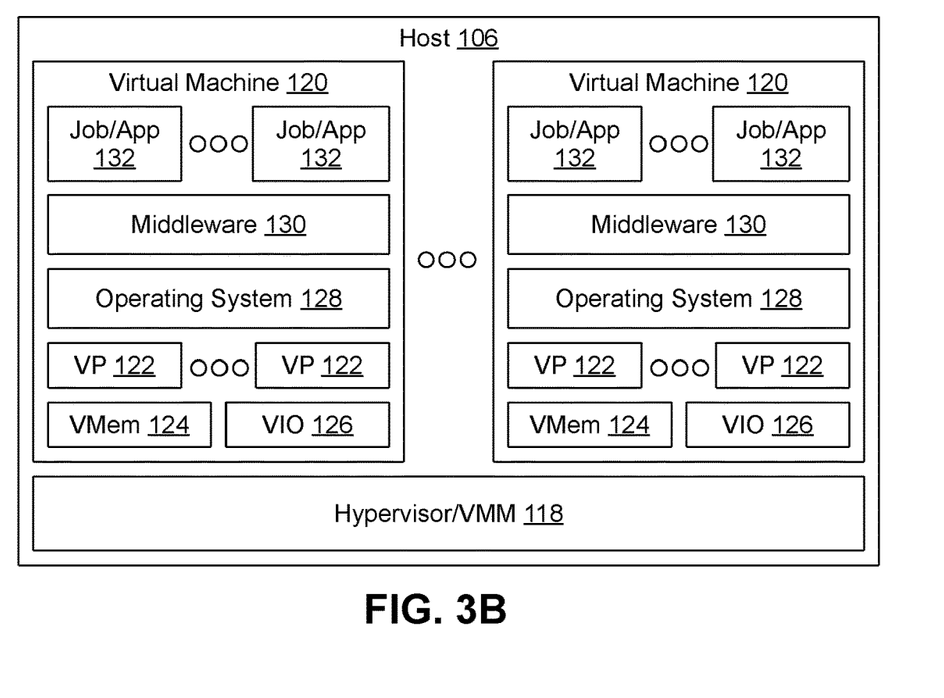

FIGS. 3A-3B illustrate the principal hardware and software components in a virtualized computing environment or apparatus 100 consistent with the invention, and suitable for implementation in a cloud computing environment such as environment 50, as well as in other cloud and/or non-cloud computing environments. As shown in FIG. 3A, apparatus 100 may include a multi-node data processing system 102 where the physical hardware is distributed among a plurality of physical processor nodes 104 disposed in a plurality of hosts or computer systems 106, with the hosts 106 disposed in one or more pools 108. Each processor node 104 includes one or more processors 110, one or more memory devices 112, and in some embodiments, additional hardware such as input/output (I/O) hardware 114 (e.g., one or more input/output (I/O) adapters) and/or networking hardware 116. Appropriate networking functionality (not shown) may also be used to provide data communication between the various processor nodes 104 and hosts 106, as well as other external systems.

Apparatus 100 may be implemented using any of a number of different architectures suitable for implementing a virtualized environment. For example, in one embodiment, apparatus 100 may include one or more of a Power 770, 780 or 795 system available from International Business Machines Corporation, the configuration of which will be apparent to one of ordinary skill in the art having the benefit of the instant disclosure. It will be appreciated, however, that other architectures suitable for executing virtualized environments may be used in other embodiments of the invention, so the invention is not limited to the particular architecture disclosed herein.

Each processor 110 may be implemented as a single or multi-threaded processor and/or as a single or multi-core processor, while each memory 112 may be considered to include one or more levels of memory devices, e.g., a DRAM-based main storage, as well as one or more levels of data, instruction and/or combination caches, with certain caches either serving individual processors or multiple processors as is well known in the art. In addition, the memory of apparatus 100 may be considered to include memory storage physically located elsewhere in apparatus 100, e.g., any cache memory in a processor, as well as any storage capacity used as a virtual memory, e.g., as stored on a mass storage device or on another computer coupled to apparatus 100.

Apparatus 100 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to apparatus 100 via network, e.g., in a distributed or client-server computing environment, whereby the processing required to implement the functions of a computer program may be allocated to multiple computers over a network.

For example, FIG. 3B illustrates various software components 118-132 that may be resident within a host 106 in apparatus 100. A hypervisor or virtual machine monitor (VMM) 118 may host one or more virtual machines (VMs) 120 and may allocate to each virtual machine 120 a portion of the physical hardware resources of host 106 (e.g., processor, memory and/or IO resources associated with one or more processor nodes 104), represented here by one or more virtual processors (VPs) 122, a virtual memory (VMem) 124 and virtual input/output (VIO) resources 126. Each virtual machine 120 may in turn host an operating system 128 and optionally middleware 130, as well as one or more jobs and/or applications 132. It will be appreciated that each virtual machine 120, which may also be referred to as a logical partition, virtual server or virtual computer, may operate in a manner that emulates a separate physical computer, and as such, may host practically any software components capable of being hosted by a computer.

Additional hardware and/or software components may also be resident in apparatus 100, e.g., mass storage hardware, external input/output devices such as printers or displays, and management hardware and/or software, e.g., a hardware management console (HMC) through which the hardware and/or software configuration of the apparatus may be managed by an administrator. Further, in the illustrated embodiments, connectivity to one or more external networks 134 may also be supported, as may connectivity to one or more storage systems 136, e.g., software defined storage (SDS) systems through one or more storage fabrics 138, and within which may be resident various volumes 140, e.g., logical storage volumes utilized to store virtual disk images for virtual machines. Virtualized environments may be implemented in an innumerable number of manners, and may include an innumerable number of hardware and/or software variations, and as such, the invention is not limited to the particular implementation disclosed herein.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1, 2, 3A and 3B is not intended to limit the present invention. Indeed, those skilled in the art will recognize that other alternative hardware and/or software environments may be used without departing from the scope of the invention.

Virtual Machine Migration Between Software Defined Storage Systems

Embodiments consistent with the invention may be used to enhance the management of virtualized computing environments in part by facilitating the migration of logical storage volumes data, or volumes data, between different software defined storage (SDS) systems. As will become more apparent below, an orchestration engine in a virtualized computing environment may be configured to support automated migration of virtual machine volumes between SDS systems. In some embodiments, an identification may be made of one or more volumes associated with one or more virtual machines and resident in a first SDS system to migrate to a second SDS system. Then, for each identified volume among the one or more identified volumes, a replacement volume for the identified volume on the second SDS system may be created, the replacement volume may be mapped to the associated virtual machine for the identified volume, the associated virtual machine may be caused to discover the replacement volume, data from the identified volume may be mirrored to the replacement volume, the identified volume may be unmapped from the associated virtual machine, and the identified volume may be deleted from the first SDS system.

It has been found, for example, that it may be desirable in some embodiments for a customer to want to move an installation from using one storage provider's SDS system to that of another storage provider, e.g., to move volumes between storage providers based on some utilization characteristic of each storage provider. Embodiments consistent with the invention therefore utilize an orchestration engine to support the migration of an existing virtual machine, and in particular the volume(s) associated therewith, from one SDS system to another. In some embodiments, the migration may be part of a manual decision to move storage from one storage back end to another when an entity is actually replacing one back end with another, while in some embodiments, the migration may be part of a dynamic resource optimization (DRO) operation where the utilization of storage back ends are determined and virtual machine volumes are moved between different SDS systems based on rules. In general, the migration may be performed while providing substantially uninterrupted access to data within the volumes being migrated between back end storage systems.

As noted above, an orchestration engine, e.g., orchestration engine 142 of FIG. 3A, may be used to coordinate the migration of virtual machine volumes between SDS systems (e.g., volumes 140 and SDS systems 138 of FIG. 3A). In this regard, an orchestration engine may be considered to be a software and/or hardware component in a virtualized computing environment having the ability to manage virtualization in the environment, e.g., the PowerVC component or the Cloud Orchestrator component available from International Business Machines Corporation, the assignee of the present application. In general, other components having suitable management functionality for creating, deleting and managing virtual machines as well as managing SDS systems through the creation, attachment, unattachment and deletion of logical storage volumes may be used as an orchestration engine in other embodiments, so the invention is not limited to the particular components described herein.

In addition, a volume may be considered to be a boot or non-boot logical storage volume utilized by a virtual machine and maintained in an SDS system. The volume may include a disk image stored therein for executing the virtual machine. In an SDS system may be considered to include a software defined storage system implemented, for example, in a storage controller such as a SAN controller, and within which may be stored one or more volumes for use by one or more virtual machines in a virtualized computing environment.

In some embodiments, an orchestration engine may be configured to identify virtual machines having volumes on an SDS system for which it is desirable to migrate to a different, target SDS system. In addition, an orchestration engine may be configured to establish that suitable connectivity exists from a virtual machine to a target SDS system, and in some instances, the orchestration engine may further be configured to change the connectivity type (e.g., Fibre Channel, iSCSI, etc.) in connection with migrating volumes between SDS systems. Further, an orchestration engine may be configured to automatically create a replacement volume (which may, in some instances, be larger than an original volume) map that volume to a virtual machine. Then, an orchestration engine may coordinate with a virtual machine to cause that virtual machine to discover a replacement volume (e.g., using hdisk on AIX or a multipath device for a volume on Linux), and mirror the original volume to the replacement volume (e.g., using devicemapper on Linux, AIX volume group mirroring, etc.), and then sever the mirror after the replacement volume accurately mirrors the original volume. In addition, in some embodiments, an orchestration engine may establish a replacement volume as a boot volume for a virtual machine if the original volume is a boot volume or the equivalent. Thereafter, an orchestration engine may un-map the original volume from the virtual machine and delete the original volume.

In addition, in some embodiments, rules may be used to control the migration of virtual machines between SDS systems. For example, SDS systems and/or virtual machines managed thereby may be analyzed for current usage, percent full space, percent full number of host entries, percent full number of volumes, storage agreements (spindles, flash, combo, etc.), percent full Fibre Channel target adapters, SDS system storage CPU and/or IO utilization (i.e., how busy the SDS system end is) to determine when it is appropriate to move a volume from a busy SDS system to a less busy SDS system, and in some instances increase the size of the volume by a certain percentage when the volume is a threshold percentage full in the virtual machine, etc.

In one example, embodiment, for example, an SDS system may be examined for its percent full properties, including for both source and destination calculations. As one example, a threshold percentage such as 75% may trigger migration and cause an orchestration engine to look for an SDS system that is less than 50% full as a target. Likewise, an SDS system may be analyzed for how busy it is based on CPU and/or IO operations and volumes to trigger a migration to a less busy SDS system. Further, based rules established for a migration, a replacement volume may be increased in size in connection with a migration if a virtual machine's utilization of that volume is above a threshold of utilization as reported by the virtual machine. In addition, when migrating between SDS systems a rule may also be established to change the protocol used to connect a volume to a virtual machine based on utilization of the volume from the virtual machine. As an example, in some embodiments, low utilization on a volume might allow a volume to be moved from Fibre Channel to iSCSI and high utilization might allow the volume to be moved from iSCSI to Fibre Channel.

Figure 4:
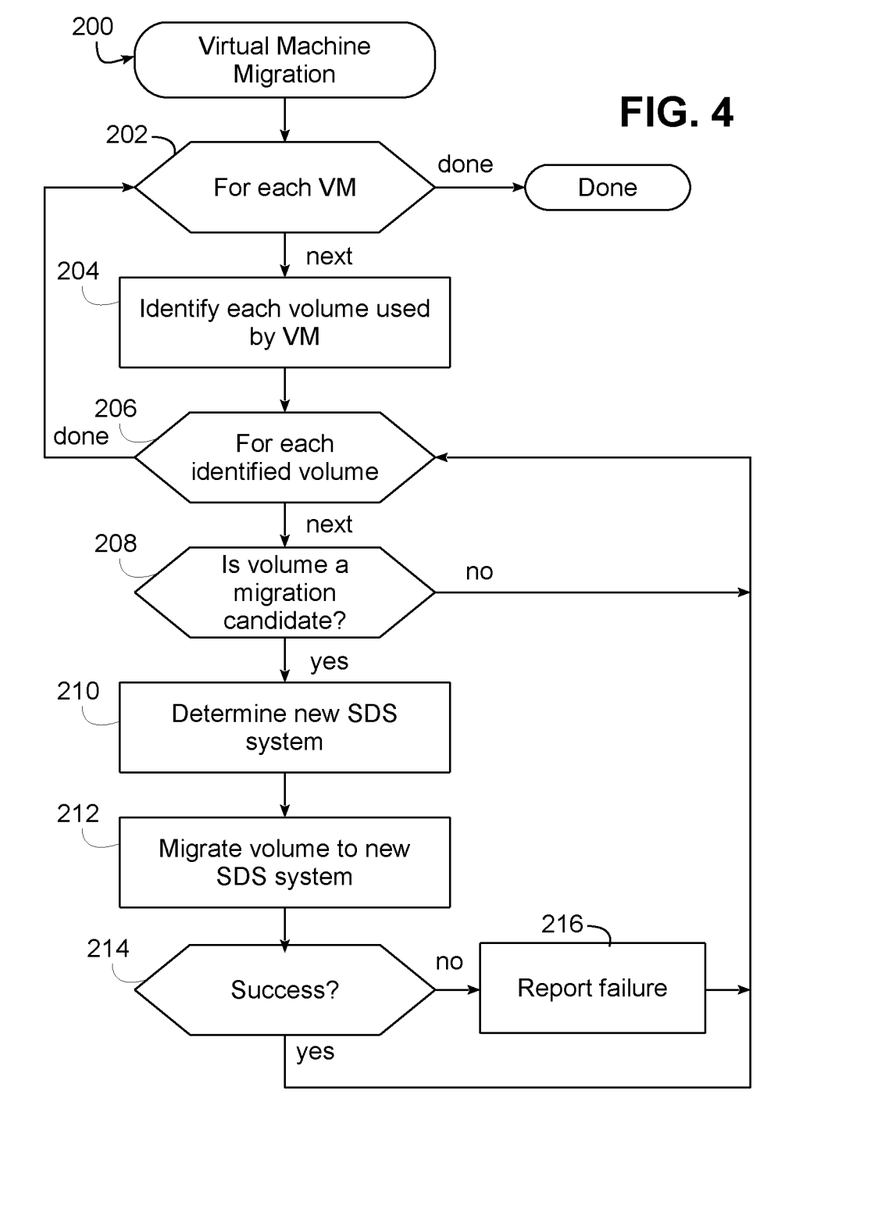
FIG. 4 is a flowchart illustrating an example sequence of operations for migrating virtual machines in the virtualized computing environment of FIGS. 3A-3B.
Figure 5:
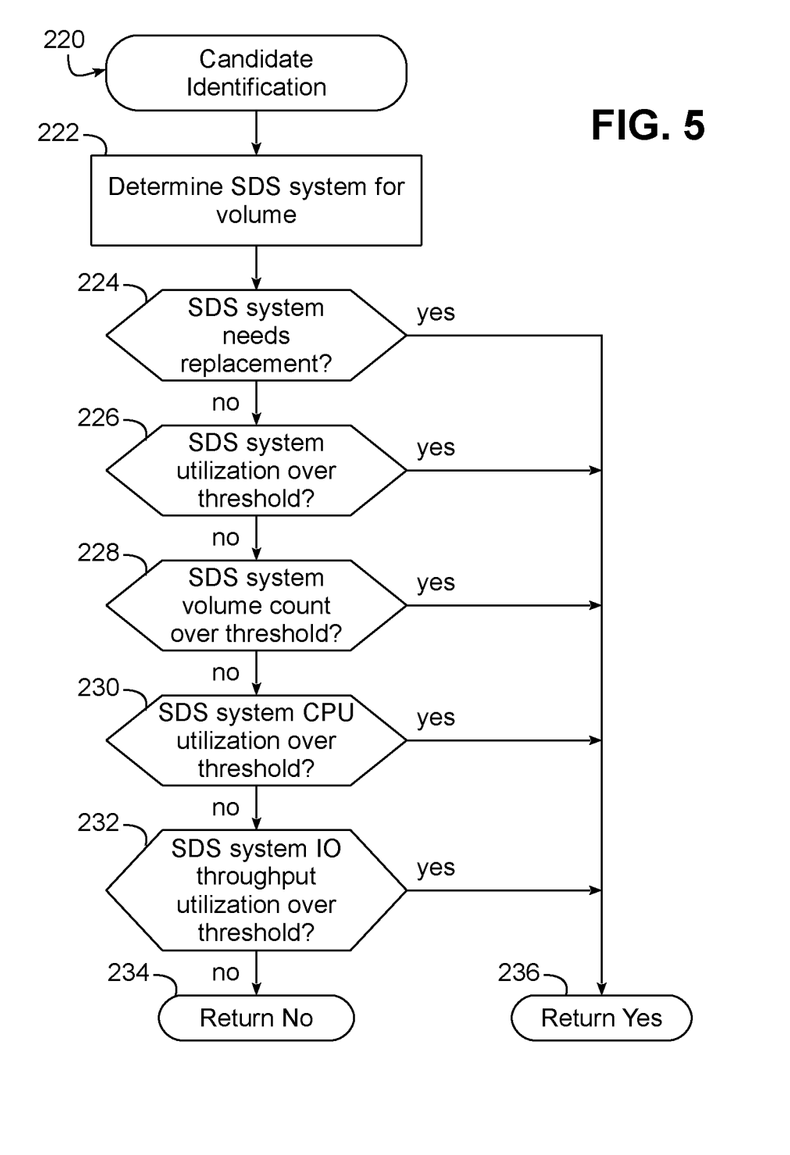
FIG. 5 is a flowchart illustrating an example sequence of operations for identifying a migration candidate in the virtualized computing environment of FIGS. 3A-3B.

FIGS. 4-7 next illustrate an example implementation of virtual machine migration in virtualized computing environment such as environment 100 of FIGS. 3A-3B. FIG. 4, in particular, illustrates a sequence of operations 200 for implementing a virtual machine migration, e.g., as coordinated by an orchestration engine 142 (FIG. 3A). Sequence of operations 200 may be initiated, for example, in response to a user or administrator request to migrate a particular virtual machine and/or virtual machine volume to a different SDS system, a user or administrator request to rebalance virtual machines across SDS systems, or an automated management operation that is initiated on demand or periodically to rebalance virtual machines across SDS systems.

Sequence of operations 200 begins in block 202 by initiating a FOR loop to process each virtual machine (or a specified subset of virtual machines) managed by the orchestration engine. For each such virtual machine, block 204 identifies each volume used by the virtual machine, and block 206 initiates a FOR loop to process each identified volume for the virtual machine. Block 208 then determines whether the volume is a candidate for migration, one implementation of which is discussed below in connection with FIG. 5. If the volume is not a migration candidate, control returns to process the next identified volume. If the volume is a candidate, however, control passes to block 210 to determine a new, target SDS system to which the candidate volume should be migrated. One implementation for determining a target SDS system is discussed in connection with FIG. 6 below. Next, once the target SDS system is identified, control passes to block 212 to migrate the volume to the new or target SDS system. One implementation for migrating a volume to a target SDS system is discussed in connection with FIG. 7 below. Block 214 then determines if the migration was a success, and if not, control passes to block 216 to report the failure, e.g., on a log or a notification to a user, and control then passes to block 206 to process the next identified volume for the current virtual machine. If block 214 determines that the migration was a success, control also returns to block 206. Once block 206 determines that each identified volume for the current virtual machine has been processed, control returns to block 202 to process the next virtual machine, and once all virtual machines have been processed, the virtual machine migration is complete.

As noted above, FIG. 5 illustrates at 220 an example sequence of operations for identifying a candidate volume, e.g., for implementing in block 208 of FIG. 4. Block 222 first determines the SDS system for the candidate volume, and blocks 224-232 test a number of conditions that may trigger migration of a volume to a different SDS system. Block 224 for example determines if the SDS system needs replacement, e.g., in the event that virtual machine migration is manually initiated by user or administrator prior to replacing an SDS system. Blocks 226-232 determine if the SDS system meets a migration criterion, e.g., a criterion established to determine when volumes resident on an SDS system should be migrated based upon the utilization of the underlying SDS system. Block 226, for example, may determine if the SDS system utilization is over a threshold, while blocks 228-232 may determine other measures of utilization, in particular whether a volume count on the SDS system is over a threshold (block 228), whether CPU utilization in the SDS system is over a threshold (block 230) and whether IO throughput utilization in the SDS system is over a threshold (block 232). If all of these conditions are false, the volume is not a candidate for migration, so control passes to block 234 to return a no result. If, however, any of these conditions is true, the volume is a candidate for migration, so control passes to block 236 to return a true result.

It will be appreciated that in other embodiments, any of blocks 224-232 may be omitted. Further, the determination of whether or not to migrate a volume may be made in response to a wide variety of different migration criteria. For example, rules-based decision logic may be used in some embodiments, and different rules may be established for different customers, SDS systems, virtual machines and/or volumes. Criteria such as those describe above as well as in FIG. 5 may be used in different embodiments, so the invention is not limited to the particular criteria described herein.

Figure 6:
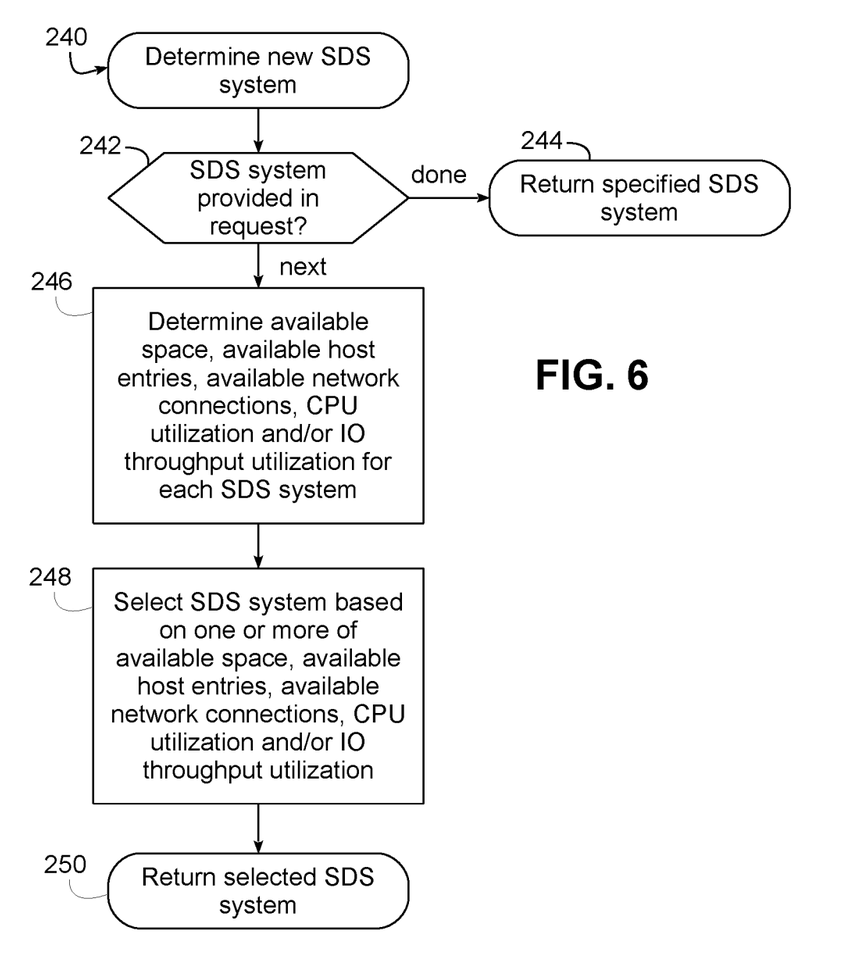
FIG. 6 is a flowchart illustrating an example sequence of operations for determining a target SDS system in the virtualized computing environment of FIGS. 3A-3B.

FIG. 6 next illustrates at 240 an example sequence of operations for determining a new SDS system, e.g., for implementing block 210 of FIG. 4. Block 242 first determines if the target SDS system is provided in the request, e.g., if the request is to manually migrate a volume or all of the volumes of a particular virtual machine to a specified SDS system. If so, control passes to block 244 to simply return the specified SDS system. Otherwise, control passes to block 246 to determine available space, available host entries, available network connections, CPU utilization and/or IO throughput utilization for one or more SDS systems that are candidates for the migration, and then to block 248 to select an SDS system based upon one or more of these parameters, whereby the selected SDS system is returned in block 250. As with the selection of a candidate volume, the determination of a new or target SDS system may also be based on various rule-based decision logic, e.g., load balancing logic suitable for balancing load across multiple SDS systems.

Figure 7:
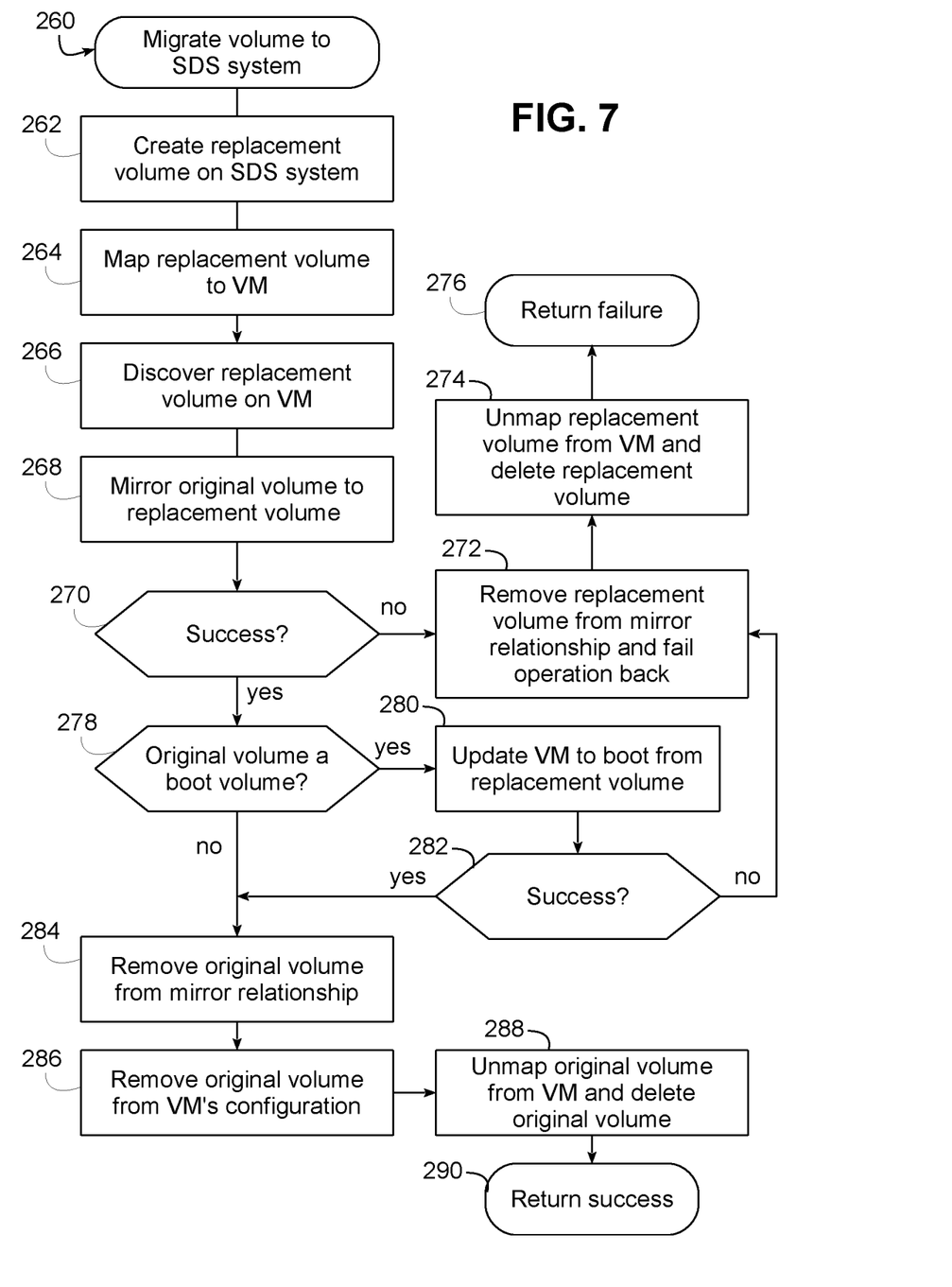
FIG. 7 is a flowchart illustrating an example sequence of operations for migrating a volume to a target SDS system in the virtualized computing environment of FIGS. 3A-3B.

Now turning to FIG. 7, this figure illustrates at 260 an example sequence of operation for migrating a candidate volume to a target SDS system, e.g., for implementing block 212 of FIG. 4. In block 262, a replacement volume is created on the target SDS system, and in block 264, the replacement volume is mapped to the virtual machine for the original volume. In some instances, it may also be desirable to create the replacement volume with a different size, e.g., to increase the size of the migrated volume compared to the original volume. Next, in block 266, replacement of the original volume with the replacement volume is initiated, first by causing the virtual machine to discover the replacement volume, then in block 268 mirroring the original volume to the replacement volume, e.g., using disk mirroring functionality of the virtual machine. Doing so establishes the replacement volume as a mirror of the original volume, and block 270 determines whether establishment of the mirror was a success. If establishment of the mirror was unsuccessful or the volume could not be completely mirrored, block 270 passes control to block 272 to remove the replacement volume from the mirror relationship and fail back (effectively undo) the operation. Block 274 then unmaps the replacement volume from the virtual machine and deletes the replacement volume, and a failure notification is returned in block 276.

Otherwise, if successful, block 270 passes control to block 278 to determine if the original volume is a boot volume (i.e., the volume from which the virtual machine boots). If so, control passes to block 280 to update the virtual machine to boot from the replacement volume, and then to block 282 to determine whether this operation was a success. If not, control passes to block 272 to fail back the operation. It will be appreciated that in connection with updating the virtual machine, other operating system-specific operations such as dump spaces and boot records may be updated.

If the update in block 280 is successful, or if the original volume was not a boot volume, control passes to block 284 to remove the original volume from the mirror relationship, to block 286 to remove the original volume from the virtual machine's configuration, and then to block 288 to unmap the original volume from the virtual machine and delete the original volume, and a success notification is returned in block 290.

It will be appreciated that while the aforementioned operations in FIGS. 4-7 are illustrated in sequential order, in some embodiments, the operations may be parallelized such that multiple volumes are migrated concurrently. Furthermore, it will be appreciated that the determination of SDS systems as the targets of migrations may be performed for multiple volumes and/or virtual machines at a time to balance the load across multiple SDS systems. Further, in some embodiments, all of the volumes for a virtual machine may be migrated together to reside on the same target SDS system, while in other embodiments volumes for a virtual machine may be distributed across multiple SDS systems. Further, in some embodiments it may be desirable for performance reasons to spread volumes across multiple SDS systems, while in other embodiments, e.g., for energy conservation, it may be desirable to consolidate volumes on fewer numbers of SDS systems to permit one or more SDS systems to be powered down.

Further, in some embodiments, it may be desirable to enable a request for volume migration to specify a target SDS system, or to request SDS systems having certain characteristics, e.g., hybrid storage, flash storage, Fibre Channel connectivity, iSCSI connectivity, utilization below a percentage threshold, etc. Further, in instances where a volume is migrated from an SDS system having one type of connectivity to another, it will be appreciated that migration may include suitable functionality for establishing the new type of connectivity for the migrated volume.

It also will be appreciated that the various operations discussed above in connection with migrating a volume of a virtual machine to a target SDS system may be implemented within an orchestration engine having access to both SDS systems and to virtual machines, and generally utilizing, as needed, appropriate command or interfaces exposed to the orchestration engine by the virtualization platform and/or the SDS systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of virtual machine volume migration between software defined storage (SDS) systems, the method comprising, in an orchestration engine configured to manage one or more virtual machines and executed by one or more processors:
    identifying one or more volumes associated with the one or more virtual machines and resident in a first SDS system to migrate to a second SDS system, wherein at least one SDS system is determined by a predetermined set of parameters and at least one SDS system is determined by a rule-based decision logic algorithm; and
    for each identified volume among the one or more identified volumes, wherein at least one volume is determined to be a candidate for migration between the first SDS system and the second SDS system:
    creating a replacement volume for the identified volume on the second SDS system;
    mapping the replacement volume to the associated virtual machine for the identified volume;
    causing the associated virtual machine to discover the replacement volume;
    mirroring data from the identified volume to the replacement volume;
    unmapping the identified volume from the associated virtual machine; and
    deleting the identified volume from the first SDS system.

2. The method of claim 1, wherein identifying the one or more volumes is based on a request submitted to the orchestration engine.

3. The method of claim 1, wherein determining if the volume is a candidate for migration includes determining if the first SDS system is being replaced.

4. The method of claim 1, wherein determining if the volume is a candidate for migration includes determining if the first SDS system meets a migration criterion.

5. The method of claim 4, wherein the migration criterion is based on one or more of system utilization, volume count, CPU utilization or IO throughput utilization of the first SDS system.

6. The method of claim 1, further comprising selecting the second SDS system.

7. The method of claim 6, wherein selecting the second SDS system is based on a request submitted to the orchestration engine.

8. The method of claim 6, wherein selecting the second SDS system is based on one or more of available space, available network connections, CPU utilization, or Input/Output (TO) throughput utilization of one or more candidate SDS systems.

9. The method of claim 1, further comprising changing a size of the replacement volume relative to the identified volume.

10. The method of claim 1, wherein changing the size of the replacement volume includes creating the replacement volume with a larger size than the identified volume.

11. The method of claim 1, wherein unmapping and deleting the identified volume are performed in response to a successful establishment of a mirror between the identified and replacement volumes.

12. The method of claim 11, further comprising unmapping and deleting the replacement volume in response to an unsuccessful establishment of the mirror between the identified and replacement volumes.

13. The method of claim 1, wherein mirroring the data includes establishing a mirror between the identified and replacement volumes.

14. The method of claim 13, further comprising removing the identified volume from the mirror after establishing the mirror.

15. The method of claim 13, further comprising removing the identified volume from a configuration of the virtual machine after establishing the mirror.

16. The method of claim 1, further comprising: determining if the identified volume is a boot volume; and in response to determining that the identified volume is a boot volume, updating the virtual machine to boot from the replacement volume.

17. The method of claim 1, further comprising performing the creating of the replacement volume, mapping the replacement volume, causing the associated virtual machine to discover the replacement volume, mirroring data, unmapping the identified volume and deleting the identified volume are performed concurrently with migration of other identified volumes among the one or more volumes.

18. An apparatus, comprising:
at least one processor; and
program code configured upon execution by the at least one processor to perform virtual machine volume migration between software defined storage (SDS) systems, the program code including an orchestration engine configured to manage one or more virtual machines by:
identifying one or more volumes associated with the one or more virtual machines and resident in a first SDS system to migrate to a second SDS system, wherein at least one SDS system is determined by a predetermined set of parameters and at least one SDS system is determined by a rule-based decision logic algorithm; and
for each identified volume among the one or more identified volumes, wherein at least one volume is determined to be a candidate for migration between the first SDS system and the second SDS system:
creating a replacement volume for the identified volume on the second SDS system;
mapping the replacement volume to the associated virtual machine for the identified volume;
causing the associated virtual machine to discover the replacement volume;
mirroring data from the identified volume to the replacement volume;
unmapping the identified volume from the associated virtual machine; and
deleting the identified volume from the first SDS system.

19. A program product, comprising:
a non-transitory computer readable medium; and
program code stored on the non-transitory computer readable medium and configured upon execution by at least one processor to perform virtual machine volume migration between software defined storage (SDS) systems, the program code including an orchestration engine configured to manage one or more virtual machines by:
identifying one or more volumes associated with the one or more virtual machines and resident in a first SDS system to migrate to a second SDS system, wherein at least one SDS system is determined by a predetermined set of parameters and at least one SDS system is determined by a rule-based decision logic algorithm; and
for each identified volume among the one or more identified volumes, wherein at least one volume is determined to be a candidate for migration between the first SDS system and the second SDS system:
creating a replacement volume for the identified volume on the second SDS system;
mapping the replacement volume to the associated virtual machine for the identified volume;
causing the associated virtual machine to discover the replacement volume;
mirroring data from the identified volume to the replacement volume;
unmapping the identified volume from the associated virtual machine; and
deleting the identified volume from the first SDS system.

* * * * *